United States Patent
Liu et al.

(10) Patent No.: US 10,489,673 B2
(45) Date of Patent: Nov. 26, 2019

(54) SYSTEM AND METHOD FOR DETECTING LANDMARKS IN A THREE-DIMENSIONAL IMAGE VOLUME

(75) Inventors: David Liu, Princeton, NJ (US); Shaohua Kevin Zhou, Plainsboro, NJ (US); Sascha Seifert, Königsbach-Stein (DE); Dominik Bernhardt, Karlsruhe (DE); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 2800 days.

(21) Appl. No.: 12/728,315

(22) Filed: Mar. 22, 2010

(65) Prior Publication Data

US 2010/0254582 A1    Oct. 7, 2010

Related U.S. Application Data

(60) Provisional application No. 61/166,368, filed on Apr. 3, 2009.

(51) Int. Cl.
*G06K 9/46* (2006.01)

(52) U.S. Cl.
CPC .................. *G06K 9/4638* (2013.01)

(58) Field of Classification Search
CPC .... G06K 9/4638; G06K 9/6224; G06K 9/469; G06K 2009/00932; G06K 2209/05; G06T 2207/10072
USPC ...................................................... 382/128
See application file for complete search history.

(56) References Cited

U.S. PATENT DOCUMENTS

| | | | |
|---|---|---|---|
| 7,547,283 B2* | 6/2009 | Mourad et al. | 600/459 |
| 2008/0101676 A1 | 5/2008 | Zheng et al. | |
| 2008/0262814 A1 | 10/2008 | Zheng et al. | |
| 2008/0273777 A1* | 11/2008 | Luboz et al. | 382/130 |
| 2008/0317308 A1* | 12/2008 | Wu et al. | 382/128 |
| 2009/0046951 A1* | 2/2009 | Paragios et al. | 382/294 |
| 2009/0149751 A1* | 6/2009 | Mourad et al. | 600/438 |

OTHER PUBLICATIONS

Zheng, Y. et al., "Four Chamber Heart Modeling and Automatic Segmentation for 3D Cardiac CT Volumes Using Marginal Space Learning and Steerable Features", IEEE Transactions on Medical Imaging, 27(11), Nov. 2008.
Ling, H et al., "Hierarchical, Learning-Based Automatic Liver Segmentation", CVPR, 2008.
U.S. Appl. No. 12/567,197, filed Sep. 25, 2009.

* cited by examiner

*Primary Examiner* — Reginald R Reyes (57) ABSTRACT

A method and apparatus for detecting vascular landmarks in a 3D image volume, such as a CT volume, is disclosed. One or more guide slices are detected in a 3D image volume. A set of landmark candidates for multiple target vascular landmarks are then detected based on the guide slices. A node potential value for each landmark candidate is generated based on an error value determined using spatial histogram-based error regression, and edge potential values for pairs of landmark candidates are generated based on a bifurcation analysis of the image volume using vessel tracing. The optimal landmark candidate for each target landmark is then determined using a Markov random field model based on the node potential values and the edge potential values.

23 Claims, 10 Drawing Sheets

SYSTEM AND METHOD FOR DETECTING LANDMARKS IN A THREE-DIMENSIONAL IMAGE VOLUME

This application claims the benefit of U.S. Provisional Application No. 61/166,368, filed Apr. 3, 2009, the disclosure of which is herein incorporated by reference.

BACKGROUND

This specification relates generally to a system and method for detecting anatomic landmarks in a three-dimensional image volume.

Imaging technologies such as computerized tomography (CT) and magnetic resonance imaging (MRI) enable medical practitioners to obtain a three-dimensional (3-D) image of a patient's body, facilitating a more accurate diagnosis of a patient's condition. However, analysis of a 3-D image volume by a specialist for the purpose of identifying organs or other landmarks can be time consuming; therefore, there is an ongoing need for automatic detection of landmarks in 3-D image volumes. Many existing systems and methods for detecting landmarks in 3-D image volumes use landmark detectors which are trained to identify a desired landmark in a 3-D image volume based on training data. Based on an analysis of the training data, the landmark detector develops rules enabling it to examine a given object within a 3-D image volume and generate a value representing a probability that the object is the desired landmark.

SUMMARY OF THE INVENTION

The present invention provides a method and system for automatic vascular landmark detection in 3D image volumes. Embodiments of the present invention utilize spatial histogram-based error regression and vessel tracing based bifurcation analysis together with a Markov random field model to accurately detect a multiple target vascular landmarks.

In one embodiment, a set of landmark candidates for multiple target vascular landmarks are detected. A node potential value for each landmark candidate is generated based on an error value determined using spatial histogram-based error regression, and edge potential values for pairs of landmark candidates are generated based on a bifurcation analysis of the image volume using vessel tracing. The optimal landmark candidate for each target landmark is then determined using a Markov random field model based on the node potential values and the edge potential values.

DETAILED DESCRIPTION

The present invention relates to detecting vascular landmarks in 3D image data. Embodiments of the present invention are described herein to give a visual understanding of the landmark detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

In accordance with embodiments of the invention, apparatus and methods for detecting vascular landmarks in an image volume are provided. A three-dimensional (3-D) image volume is received, and one or more guide slices are detected in the 3-D image volume. For each of a plurality of target landmarks, a set of landmark candidates is identified in the 3-D image volume, based on the guide slices. A Markov random field model analysis is applied to the multiple sets of landmark candidates to identify an optimal landmark candidate for each target landmark.

In an embodiment of the invention, a spatial histogram-based error regression analysis technique is used to examine each set of landmark candidates and to assign to each landmark candidate within the set an error value. A node potential is determined for each landmark candidate based on this error value. A bifurcation analysis technique is applied to multiple pairs of landmark candidates to determine edge potential values for the pairs. For example, edge potential values may be determined for all possible pairs that include landmark candidates from different sets. The node potentials and edge potential values are used as parameters in the Markov random field model analysis to identify optimal landmark candidates.

Figure 8:
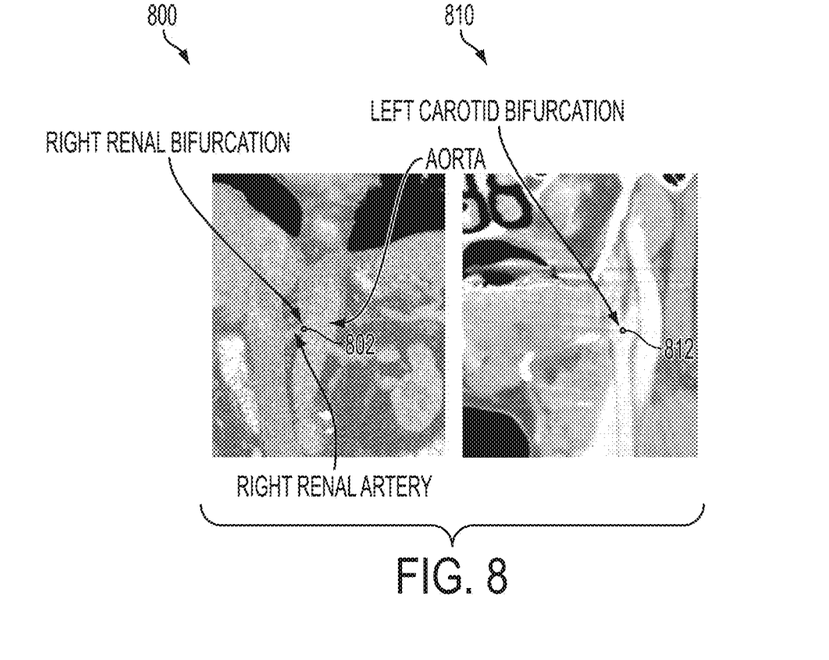
FIG. 8 illustrates examples of landmarks of interest.

The methods and apparatus described herein may be employed to identify a variety of different types of landmarks located at various locations in a patient's body. In an exemplary embodiment, the methods and apparatus described herein are used to identify landmarks in the human vascular system. As used herein, vascular landmarks refers to landmarks at bifurcations of major vessels. In particular, the following landmarks are identified: left carotid (LC), right carotid (RC), left renal (LR), right renal (RR), left subclavian (LS), left common carotid (LCC), brachiocephalic (BC), and common iliac (CI). FIG. 8 shows examples of landmarks of interest. As illustrated in FIG. 8, image 800 shows the right renal bifurcation 803, and image 810 shows the left carotid bifurcation 812.

Figure 1:
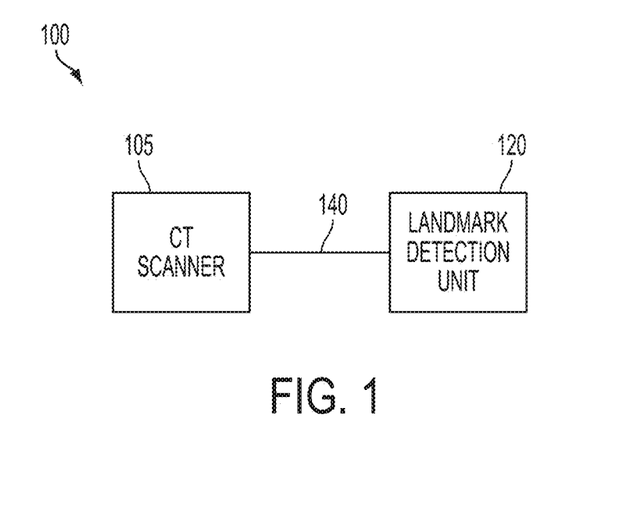
FIG. 1 illustrates an imaging and detection system that may be used to detect landmarks in an image volume, in accordance with an embodiment of the invention.

FIG. 1 illustrates an imaging and detection system that may be used to detect landmarks in an image volume, in accordance with an embodiment of the invention. Imaging and detection system 100 comprises a CT scanner 105 coupled to a landmark detection unit 120. CT scanner images a patient and generates an image volume corresponding to all or a portion of the patient's body. Any one of a number of known CT scanners may be used. Use of CT scanners to generate image volumes is known. In other embodiments, other types of imaging equipment may be used, such as MRI devices, etc. The image volume generated by CT scanner 105 is transmitted to landmark detection unit 120.

Landmark detection unit 120 analyzes the image volume, and detects a plurality of target landmarks in the image volume. Landmark detection unit 120 may comprise a computer, for example. CT scanner 105 is coupled to landmark detection unit 120 via communication path 140, which may comprise a direct link. In other embodiments, CT scanner 105 and landmark detection unit may communicate via a network. The landmark detection unit may be a computer implemented using well-known computer processors, memory units, storage devices, displays, computer software, and other components.

Figure 2:
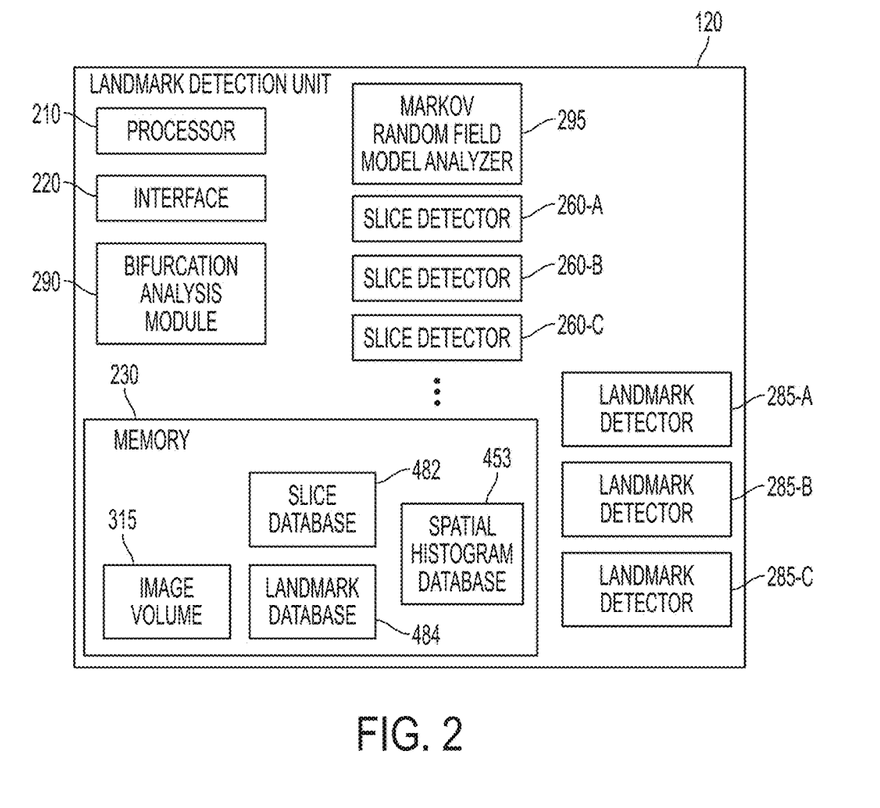
FIG. 2 is a block diagram of components of landmark detection unit, in accordance with an embodiment of the invention.

FIG. 2 is a block diagram of components of landmark detection unit 120, in accordance with an embodiment of the invention. Landmark detection unit 120 comprises a processor 210, an interface 220, and a memory 230. Processor 210 controls various operations of landmark detection unit 120 by executing computer program instructions which define such operations. The computer program instructions may be stored on a memory device such as a random access memory (RAM), one or more disk drives, one or more optical disks, one or more tape drives, etc. Processor 210 may comprise hardware, software, or a combination of hardware and software. For example, in one embodiment, processor 210 comprises operating system software controlled by hardware, such as a central processing unit (CPU).

Interface 220 provides a communication gateway through which data may be exchanged between components of landmark detection unit and other devices, such as CT scanner 105. Interface 220 is configured to receive from CT scanner data corresponding to an image volume. In various embodiments, interface 220 may be implemented using a number of different mechanisms, such as one or more enterprise systems connection cards, modems, or network interfaces. Other types of interfaces may be used.

Memory 230 is accessed by processor 210 and/or other components of landmark detection unit 120 to store various types of information. For example, in one embodiment, processor 210 may cause data corresponding to one or more image volumes to be stored in memory 230. Processor 210 may cause data to be stored in one or more databases in memory 230. Memory 230 may comprise any one or more of a variety of different types of memory devices, such as random access memory (RAM), one or more disk drives, one or more optical disks, one or more tape drives, etc. Other types of memory devices may be used.

Landmark detection unit 120 also comprises a plurality of slice detectors 260. Each slice detector 260 is configured to examine a 3-D image volume and identify a desired two-dimensional (2-D) slice within the image volume. In the exemplary embodiment of FIG. 2, three slice detectors 260-A, 260-B, 260-C are shown; however, more or fewer slice detectors may be used. As used herein, the term "slice detector 260" may refer to any one of, or all, of the slice detectors included in landmark detection unit 120.

A slice detector may be trained based on annotated training data. For example, a (human) professional may examine multiple image volumes associated with different patients and add information to each indicating the location of the target slice. The slice detector may analyze the annotated slices, and other slices, and identify information associated with the desired slice. The slice detector generate rules enabling it to examine a given slice within the 3-D image volume and assign to the slice a probability value indicating the probability that the slice is the target slice.

In one embodiment, a slice detector may be trained based on the training data using Haar wavelet features. For example, the detector may be trained based on these features using a probabilistic boosting tree ("PBT"). The PBT boosts the performance of weak classifiers to generate a strong tree-structure classifier. The trained slice detector is used to scan a training image and preserve a small number of top slice candidates.

Slice detector 260 may comprise a software program that includes multiple modules or subroutines providing respective services or functions, for example. In other embodiments, slice detector 260 may comprise multiple software programs. In alternative embodiments, slice detector 260 may comprise hardware, or a combination of hardware and software. Slice detector 260 may comprise a non-transient computer readable medium, such as a magnetic disk, magnetic tape, or optical disk, that includes instructions in the form of computer code operable to perform various functions. In some embodiments, some or all of slice detector 260 may comprise instructions in the form of computer code that are stored in memory 230.

Landmark detection unit 120 also comprises a plurality of landmark detectors 285. Each landmark detector 285 is configured to examine a 3-D image volume and identify a target vascular landmark within the image volume. In the exemplary embodiment of FIG. 2, three landmark detectors 285-A, 285-B, 285-C are shown; however, more or fewer landmark detectors may be used. As used herein, the term "landmark detector 285" may refer to any one of, or all, of the landmark detectors included in landmark detection unit 120.

A landmark detector may be trained to identify candidates for a particular target landmark based on annotated training data. For example, a (human) professional may generate training data by examining multiple search regions associated with different patients and adding information to each indicating the location of the target landmark. The landmark detector may analyze the training data and identify information associated with the target landmark. Based on the analysis of the training data, the landmark detector generates rules enabling it to examine a given object within a search region and assign to the object a probability value indicating the probability that the object is the target landmark.

According to one possible implementation, each landmark detector 285 detects bounding box candidates for the associated target landmark. This detection is cast as a binary classification problem, where each candidate box either contains the target object or not. Each candidate box is parameterized by six transformation parameters: three for translation (position) and three for orientation. The box size can be fixed a priori. Although exhaustive searching is widely used for 2D object detection, exhaustive searching for 3D objects is extremely slow. Therefore, a marginal space learning (MSL) framework can be used to train a series of classifiers for each landmark detector to detect the transformation parameters sequentially.

MSL has been developed to apply learning based techniques for 3D object detection. For example, a method for MSL-based heart chamber segmentation is described in detail in U.S. Patent Application Publication No. 2008/0101676, entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. Accordingly, the detection of a target landmark in an input 3D volume by a landmark detector is split into two steps: position detection and position-orientation detection. This generates a set of bounding box candidates (with fixed scale) for each target landmark. A separate classifier is trained based on the annotated training data for each of these steps. The classifiers can be trained using a PBT classifier. The position classifier can be trained using 3D Haar features and the orientation classifier can be trained using 3D steerable features.

Landmark detector 285 may comprise a software program that includes multiple modules or subroutines providing respective services or functions, for example. In other embodiments, landmark detector 285 may comprise hardware, or a combination of hardware and software. Landmark detector 285 may comprise a non-transient computer readable medium, such as a magnetic disk, magnetic tape, or optical disk, that includes instructions in the form of computer code operable to perform various functions. In some embodiments, some or all of landmark detector 285 may comprise instructions in the form of computer code that are stored in memory 230.

Landmark detection unit 120 also comprises a bifurcation analysis module 290. Bifurcation analysis module 290 determines edge potential values for a plurality of pairs of landmark candidates based on a path tracing algorithm.

Bifurcation analysis module 290 may comprise a software program that includes multiple modules or subroutines providing respective services or functions, for example. In other embodiments, bifurcation analysis module 290 may comprise hardware, or a combination of hardware and software. Bifurcation analysis module 290 may comprise a non-transient computer readable medium, such as a magnetic disk, magnetic tape, or optical disk, that includes instructions in the form of computer code operable to perform various functions. In some embodiments, some or all of bifurcation analysis module 290 may comprise instructions in the form of computer code that are stored in memory 230.

Landmark detection unit 120 also comprises a Markov Random Field Model Analyzer 295. Markov Random Field Model Analyzer 295 analyzes sets of landmark candidates to determine an optimal set of landmark candidates based on node potential values and edge potential values.

Markov Random Field Model analyzer 295 may comprise a software program that includes multiple modules or subroutines providing respective services or functions, for example. In other embodiments, Markov Random Field Model analyzer 295 may comprise hardware, or a combination of hardware and software. Markov Random Field Model analyzer 295 may comprise a non-transient computer readable medium, such as a magnetic disk, magnetic tape, or optical disk, that includes instructions in the form of computer code operable to perform various functions. In some embodiments, some or all of Markov Random Field Model analyzer 295 may comprise instructions in the form of computer code that are stored in memory 230.

Existing methods and apparatus for using trained detectors to identify landmarks in a 3-D image volume are associated with a number of limitations. For example, where there is a need to identify multiple landmarks within a 3-D image volume, a separate landmark detector must be developed and trained for each target landmark. Typically, each trained detector functions independently, without consideration of the inputs used by, or of the outputs generated by, the other detectors. Failure to consider the relative locations of other target landmarks may limit the accuracy of a trained detector and result in errors. Accordingly, there is a need for improved methods and apparatus for identifying landmarks in a 3-D image volume.

In accordance with an embodiment of the invention, landmarks are identified within a 3-D image volume based on one or more predetermined two-dimensional "guide slices" that are first detected within the image volume. Accordingly, each landmark detector 285 examines a selected landmark, and the guide slices, within the training data, to develop one or more rules to be used to find the landmark. A landmark detector 285 may determine one or more relationships between a selected landmark and one or more guide slices. For example, landmark detector 285 may determine that a particular landmark is typically located at an approximate distance above a particular guide slice. Landmark detector 285 subsequently identifies landmark candidates based on the guide slices and the predetermined rules or relationships. In the exemplary embodiment, five guide slices associated with the following locations in the body are used: the skull base, jaw, upper lung, upper liver, and hip bone.

Figure 3:
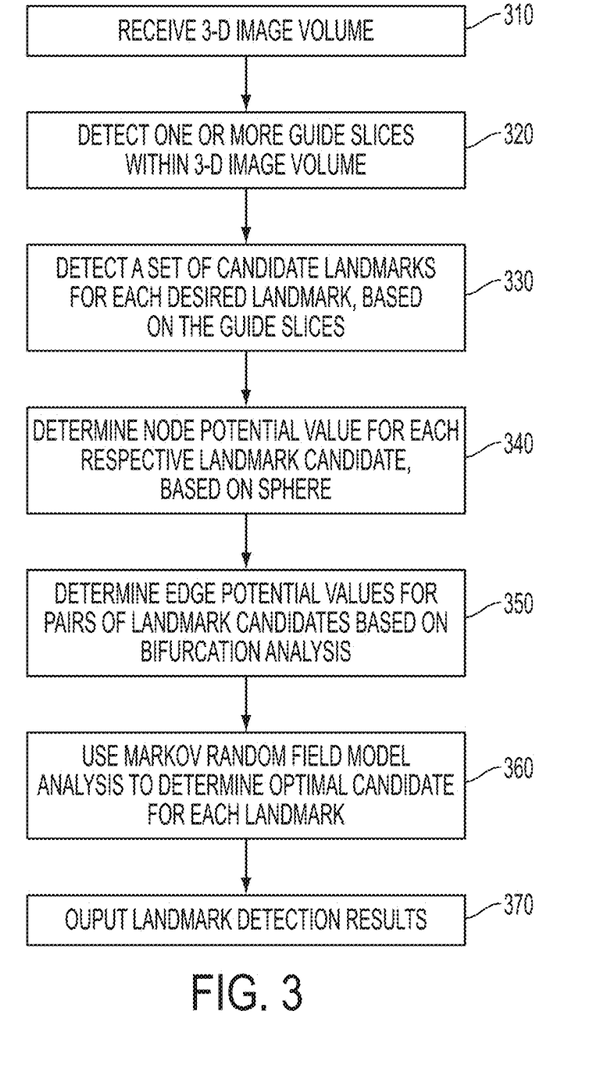
FIG. 3 depicts a method to identify target landmarks within a 3-D image volume, in accordance with an embodiment.

FIG. 3 depicts a method to identify target landmarks within a 3-D image volume, in accordance with an embodiment. At step 310, a 3-D image volume is received. In the exemplary embodiment, landmark detection unit 120 receives an image volume from CT scanner 105. Referring to FIG. 2, processor 230 may store the data corresponding to the image volume in memory 230, as image volume 315.

At step 320, a set of guide slices are detected within the 3-D image volume. Accordingly, slice detectors 260 examine the 3-D image volume and identify guide slices. In one embodiment, five guide slices associated respectively with the skull base, jaw, upper lung, upper liver, and hip bone are identified. Each guide slice is identified by a respective trained slice detector. Referring to FIG. 2, data corresponding to the guide slices may be stored in slice database 482 within memory 230.

In an advantageous implementation, in order to increase the accuracies of the slice detectors, a slice network based Markov random field (MRF) can be used. In this case, each of the slice detectors generates a set of slice candidates for the corresponding guide slice. The MRF takes into account the relative position of the detected slice candidates in order to select the best candidate slice for each of the predetermined guide slices. The MRF optimizes the slice network based on node potentials for each slice candidate and edge potentials between potential pairs of slice candidates. The node potentials are the probability scores for the slice candidates output by the trained slice detectors. The edge potentials assume a Gaussian distribution between the location of pairs of guide slice candidate, and the parameters are estimated from training data. Accordingly, potential candidates for different guide slices have a strong edge potential is their relative positions are similar to the relative positions of the corresponding guide slices in the training data.

Figure 9A:
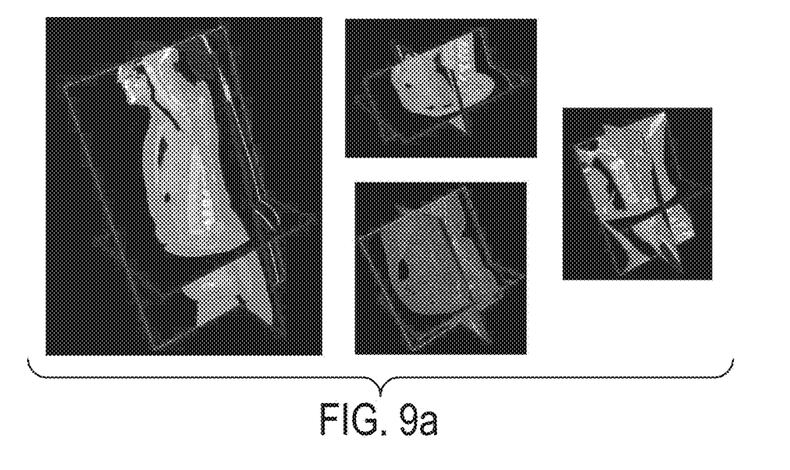
FIG. 9 illustrates exemplary slice detection results.
Figure 9B:
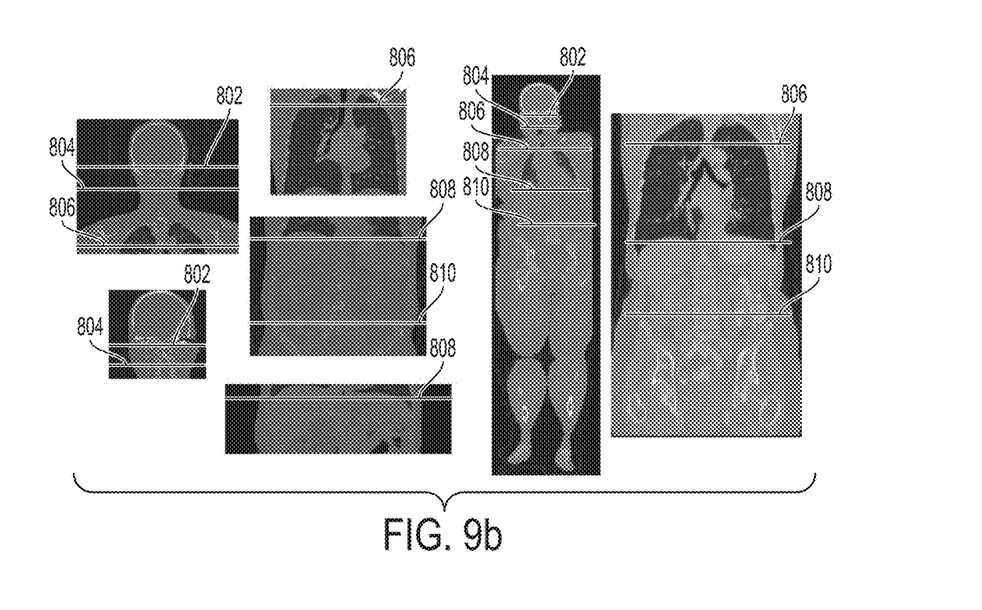

FIG. 9 illustrates exemplary slice detection results. As illustrated in FIG. 9, image set (a) shows 3D CT data including a large variety of body portions. As illustrated in image (b), shows exemplary guide slice detection results for a skull base slice 902, a jaw slice 904, an upper lung slice 906, an upper liver slice 908, and a hip bone slice 910 in different patients.

After the set of guide slices are obtained, at step 330, one or more landmark candidates is identified for each of a plurality target vascular landmarks, based on the set of guide slices. Each landmark detector 285 accordingly examines the 3-D image volume and identifies a set of landmark candidates corresponding to a target landmark. In the exemplary embodiment, a separate set of landmark candidates is identified for each of the following target landmarks: left carotid (LC), right carotid (RC), left renal (LR), right renal (RR), left subclavian (LS), left common carotid (LCC), brachiocephalic (BC), and common iliac (CI).

In one embodiment, each respective landmark detector 285 is constrained to a search region for a target landmark that is determined based on the relationships previously established between the target landmark and one or more of the guide slices. For example, a search region may be defined a predetermined distance above a particular guide slice. The respective landmark detector 285 then examines the search region and identifies one or more landmark candidates. Referring to FIG. 2, data corresponding to landmark candidates may be stored in landmark database 484.

At step 340, a node potential value is generated for each respective landmark candidate in each set identified at step 330. According to an embodiment of the present invention, the node potential value is generated based on Spatial Histogram-based Error Regression (SHERE). For example, the node potential value may be an inverse of the error value determined using SPHERE. Alternatively, the node potential can be generated by combining a SPHERE error value with a probability score generated by the corresponding landmark detector indicating a probability that the candidate is the target landmark. Methods and apparatus for determining node potential values are discussed in further detail below.

At step 350, edge potentials are determined for multiple pairs of landmark candidates using a bifurcation analysis. All possible pairs of landmark candidates that include candidates from different sets may be analyzed, for example. An edge potential value for a pair of landmark candidates is generated based on an analysis of the relative locations of a pair of landmark candidates and the relative locations of the landmarks to vessel bifurcations. Methods and apparatus for determining edge potential values are discussed in further detail below. Node potential values and edge potential values may be stored in landmark database 484 (shown in FIG. 2).

At step 360, landmark candidates in each set are analyzed using a Markov random field model analysis, based on their respective node values and associated edge potential values. Markov random field analysis treats the landmark candidates as possible nodes in a network. Each node has a node potential value, and each pair of candidates is assigned an edge potential value. An optimal set of nodes is determined based on the node potential values and edge potential values. The Markov random field model exploits the spatial relationship between landmark candidates for different target landmarks in order to select the best candidate for each landmark. Accordingly, Markov Random Field Model Analyzer 295 analyzes landmark candidates in each set to determine optimal landmark candidates, based on the node potential values and edge potential values associated with the landmark candidates. The result of the Markov random field model analysis performed at step 340 is an optimal landmark candidate for each target landmark.

At step 370, the landmark detection results are output. The landmark detection results identify the location of each of the target landmarks. For example, the landmark detection results may be output by displaying the landmark detection results on a display of the landmark detection unit 120.

In some embodiments, the method steps described in FIG. 3 are defined by computer program instructions that are stored in memory 230 of landmark detection unit 120 and executed by processor 210. In one example, landmark detection unit 120 comprises various computer program instructions implemented as computer executable code appropriately programmed by one skilled in the art to perform the algorithm defined by the method steps described in FIG. 3. By executing the computer program instructions, processor 210 executes the algorithm defined by the method steps of FIG. 3.

In accordance with an embodiment of the invention, node potential values are determined for landmark candidates using a spatial histogram-based error regression analysis technique. In this embodiment, the training data for each target landmark includes a plurality of spatial histograms representing regions at or near the landmark.

In the exemplary embodiment, a set of spatial histograms are generated based on image volumes in the training data, and the spatial histograms to assign an error value to each landmark candidate in the received 3D image data. In each of the training volumes, a 3-D score map is generated in a selected region associated with the landmark. The score map assigns to each pixel a score, which is the output value from the PBT classifier (i.e., the corresponding landmark detector).

A spatial histogram is generated for each of a plurality of pixels in the selected region based on the score map. The spatial histogram captures information relating to surrounding pixels. In one embodiment, a spatial histogram representing a region centered at the target landmark (the "central histogram") is obtained. In addition, multiple spatial histograms representing regions located within a predetermined radius of the landmark are obtained. Spatial histograms representing such regions may be generated based on one, or more than one, training volumes. The spatial histograms generated based on the training volumes are stored. Referring to FIG. 2, the spatial histograms may be stored in a spatial histogram database 453 within memory 230.

In one embodiment, a log-polar type of histogram is used to account for larger variations at more distant neighborhoods. The structure may be 2-D or 3-D depending on the image modality.

Each stored spatial histogram is analyzed to determine how similar it is to the central histogram. An error value is assigned to each stored spatial histogram based on its level of similarity to the central histogram. In one embodiment, Euclidean distance is used to determine the similarity or dissimilarity between two spatial histograms. A robust k-nearest neighbor regression may be used for the assignment of errors from seen to unseen data. The estimated error may be set to the median error from the k most similar spatial histograms. Other methods may be used to determine similarity. The error values are also stored, in association with their corresponding spatial histograms.

Figure 4:
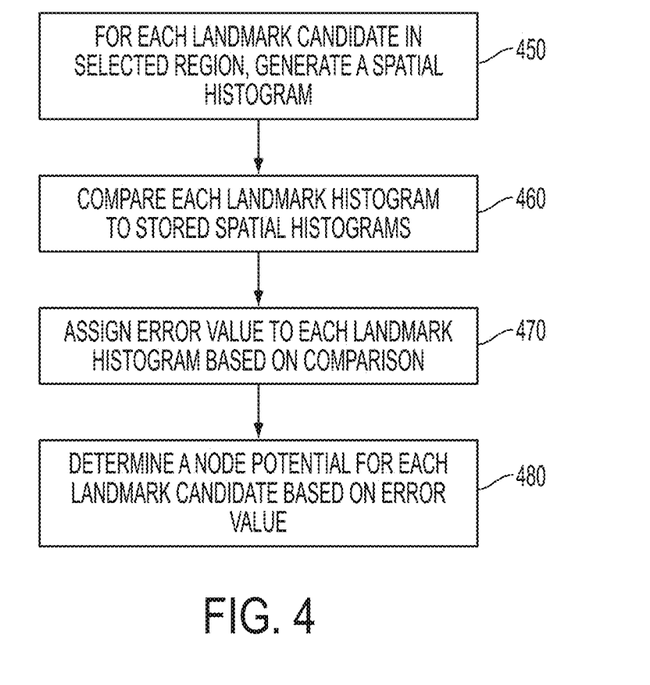
FIG. 4 depicts a method for determining error values for landmark candidates, in accordance with an embodiment of the present invention.

The stored spatial histograms are used to assign error values to landmark candidates. FIG. 4 depicts a method for determining error values for landmark candidates, in accordance with an embodiment of the present invention. This method is used for each target landmark to determine node potentials for the corresponding landmark candidates.

At step 450, for each landmark candidate for a target landmark, a spatial histogram is generated. In order to generate the spatial histograms for each landmark candidate, a score map of the corresponding region of the received 3D image can be generated, and a spatial histogram centered at each landmark candidate. The score map is generating by assigning each pixel a score corresponding to the probability value detected for that pixel by the corresponding landmark detector.

At step 460, the spatial histogram associated with each landmark candidate is compared to the stored spatial histograms. In the exemplary embodiment, the spatial histogram associated with each landmark candidate is compared to the spatial histograms generated based on training data and stored in spatial histogram database 453. For each spatial histogram associated with a landmark candidate, landmark detector 285 may identify a spatial histogram in database 453 to which it is most similar, for example.

At step 470, an estimated error value is assigned to each landmark candidate based on the comparison performed at step 460. For example, landmark detector 285 may assign an error value equal to the error value of the most similar spatial histogram identified during the comparison performed at step 460.

At step 480, a node potential is determined for each landmark candidate based on the error value assigned at step 470. According to a possible implementation, the inverse of the error value of a landmark candidate can be used as the node potential for that landmark candidate. According to another possible implementation, the error value (or the inverse of the error value) for a landmark candidate can be combined with the probability value determined by the corresponding landmark detector for that landmark candidate in order to determine a node potential for that landmark candidate.

In some embodiments, the method steps described in FIG. 4 are defined by computer program instructions that are stored in memory 230 of landmark detection unit 120 and executed by processor 210. In one example, landmark detection unit 120 comprises various computer program instructions implemented as computer executable code appropriately programmed by one skilled in the art to perform the algorithm defined by the method steps described in FIG. 4. By executing the computer program instructions, processor 210 executes the algorithm defined by the method steps of FIG. 4.

In accordance with an embodiment of the invention, edge potential values associated with pairs of landmark candidates are determined using a bifurcation analysis technique. The bifurcation analysis technique described herein is applicable in the detection of landmarks associated with the human vascular system, and in particular to the detection of landmarks at or near vessel bifurcations.

Figure 5:
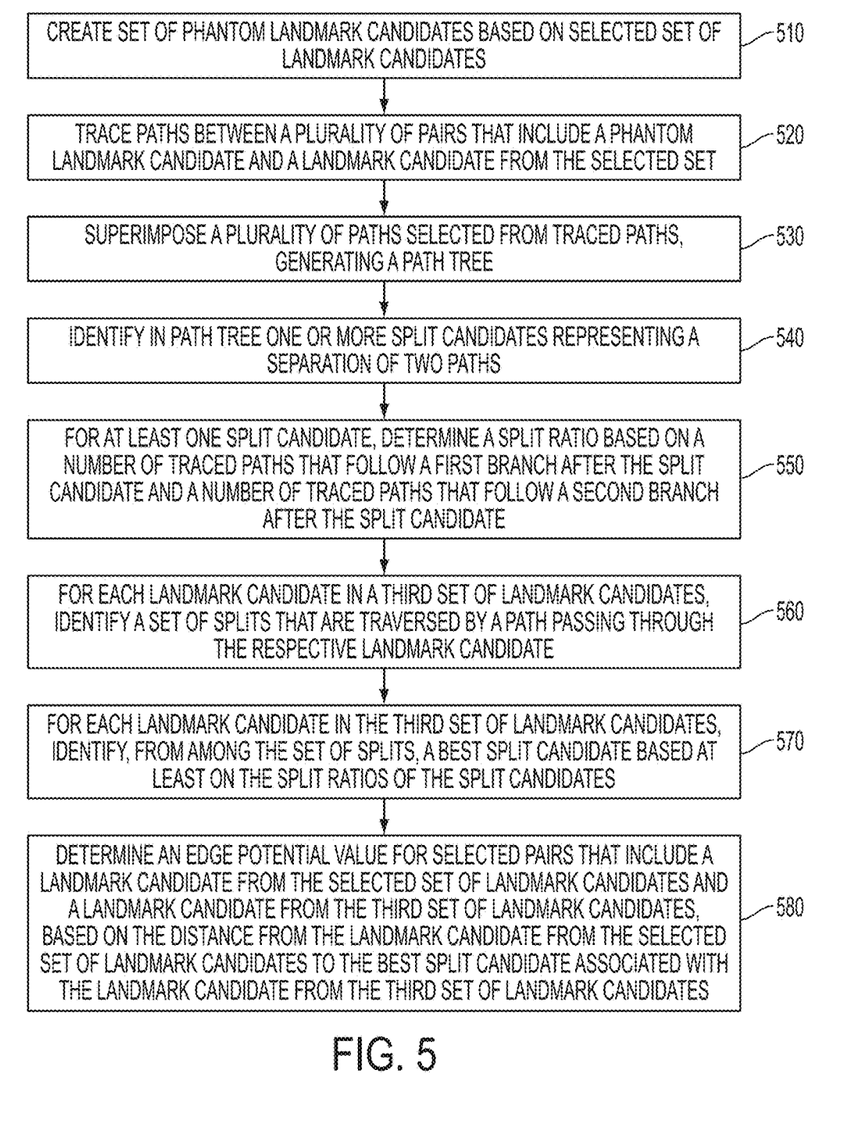
FIG. 5 is a flowchart depicting a method for generating edge potential values associated with pairs of landmark candidates, in accordance with an embodiment of the invention.

FIG. 5 is a flowchart depicting a method for generating edge potential values associated with pairs of landmark candidates, in accordance with an embodiment of the invention. The method of FIG. 5 is described with reference to two target landmarks A and B, where landmark B is defined at a vessel bifurcation and landmark A is a landmark near landmark B. For example, landmark A may be a landmark located in the vessel, before the bifurcation.

Figure 6:
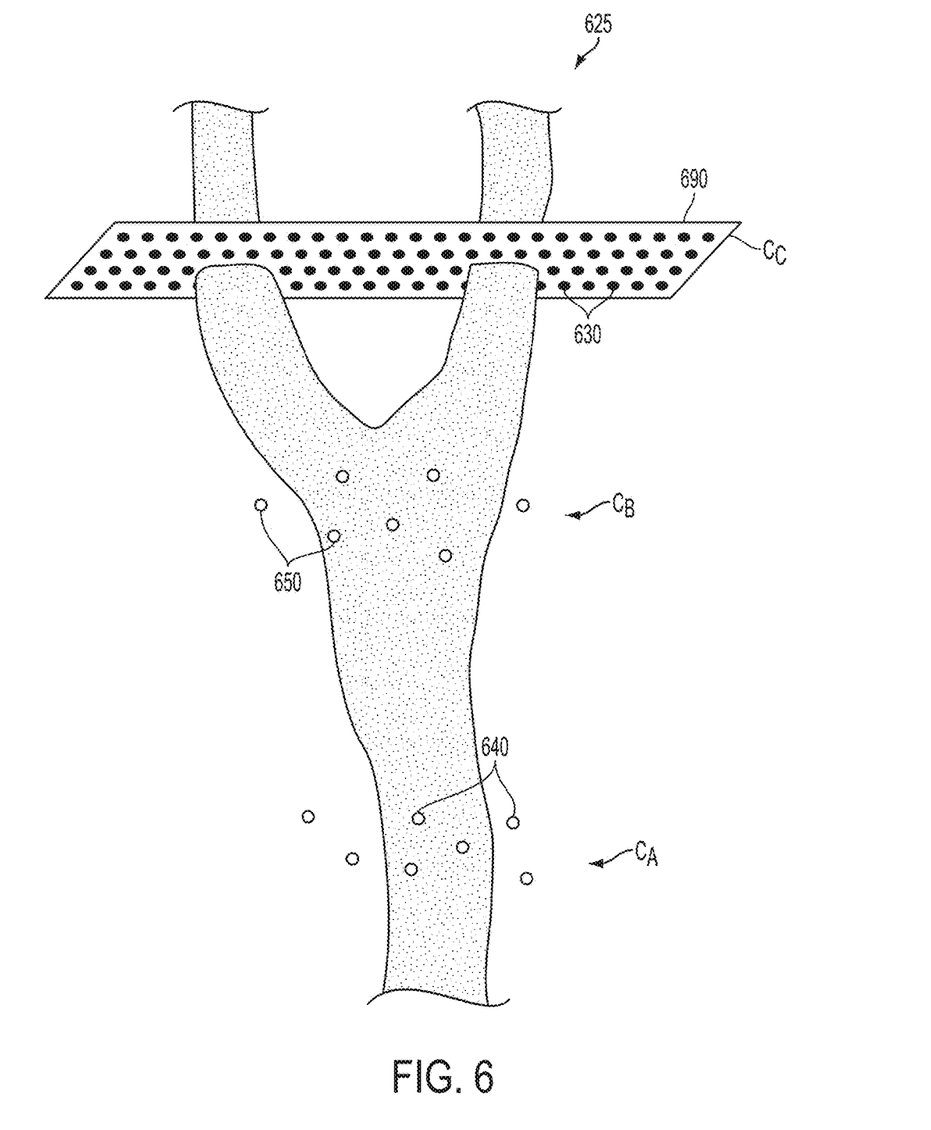
FIGS. 6 and 7 illustrate bifurcation analysis in accordance with an embodiment of the invention.

Prior to applying the bifurcation analysis technique, bifurcation analysis module 290 examines the set of landmark candidates corresponding to target landmark A, and the set of landmark candidates corresponding to target landmark B. The top N candidates within each set are selected, based on their associated probability values calculated by the corresponding landmark detector. For example, the top twenty-five landmark candidates in each set may be selected. The set of top N landmark candidates $(a_1, \ldots, a_n)$ corresponding to target landmark A are denoted $C_A$ and the set of top N landmark candidates $(b_1, \ldots, b_n)$ corresponding to target landmark B is denoted $C_B$. FIG. 6 illustrates a vessel 625, a set of landmark candidates 640 corresponding to target landmark A, denoted $C_A$, and a set of landmark candidates 650 corresponding to target landmark B, denoted $C_B$, in accordance with an embodiment of the invention.

At step 510, a set of phantom landmark candidates $C_c$ is created based on the locations of landmark candidates $C_B$. In the exemplary embodiment, bifurcation analysis module 290 determines the center of distribution of the landmark candidates in $C_B$, and defines a plane 690 located a predetermined distance away from the center of distribution to ensure that the plane is located after the vessel bifurcation and thus passes through both branches of the vessel. The distance between the plane and the center of distribution of the landmark candidates in $C_B$ may be determined based on training data, for example. Bifurcation analysis module 290 defines a set of phantom landmark candidates 630, denoted $C_c$, within plane 690 with a density sufficiently high to ensure that each of the two branches of the vessel is occupied by at least one phantom landmark candidate. Each phantom landmark candidate comprises a point in plane 690. The density of the phantom landmark candidates may be determined based on training data. For example, the density may be selected based on the observed widths of the two branches of the vessel.

At step 520, paths are traced between multiple pairs (for example, all possible pairs) that include one landmark candidate from $C_A$ and one phantom candidate from $C_c$, using a vessel tracing algorithm. Bifurcation analysis module 290 identifies and analyzes all possible pairs using a vessel tracing algorithm which may be trained to find a path that connects a pair of candidates while remaining inside the vessel most of the time. In one embodiment, a multi-scale vesselness filter is used to assign higher scores to three-dimensional pixels (voxels) having a more tube-like structure. This is based on eigenvalue analysis of the Hessian matrix. Dijkstra's algorithm is then used to find minimum cost paths given the set of terminal points. The Dijkstra graph is constructed with edge costs between two neighboring voxels being inversely proportional to the sum of the filter responses at these two voxels, so that traced paths tend to pass through voxels with higher vesselness scores. In the exemplary embodiment, a traced path does not always remain inside a vessel if one of its terminal points lies outside the vessel. It has been observed that a small perturbation of a terminal point usually causes the vessel tracing algorithm to alter the traced path only near the altered terminal point. As a result, many of the paths traced by the vessel tracing algorithm share the same central portion which lies within the vessel.

Figure 7:
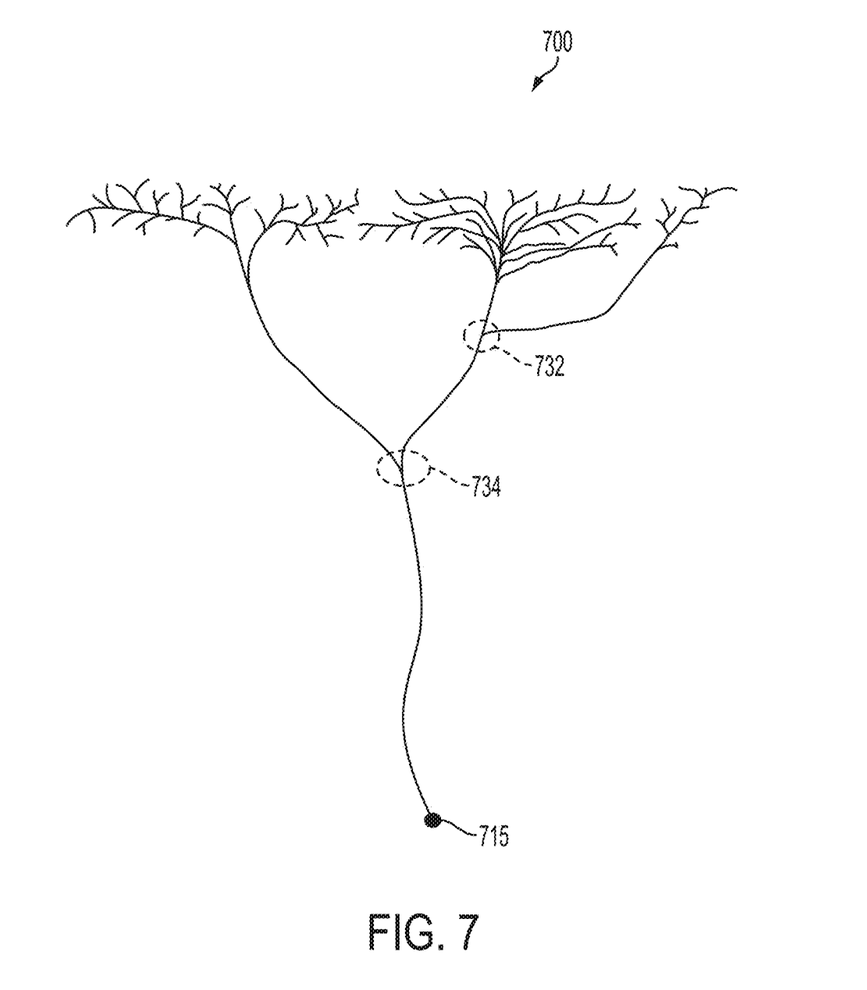

At step 530, a plurality of the traced paths selected from the traced paths generated at step 520 are superimposed to generate a path tree. Bifurcation analysis module 290 may superimpose all or a subset of the traced paths to generate a path tree. FIG. 7 illustrates a path tree 700 that may be generated by superimposing paths traced between a selected landmark candidate 715 within $C_A$ to various phantom landmark candidates within $C_C$, in accordance with an embodiment of the invention.

At step 540, one or more split candidates are identified in the path tree. In the exemplary embodiment, bifurcation analysis module 290 determines the number of traced paths $N_s$ that pass through each split in path tree 700. Splits for which $N_s$ is equal to or greater than a predetermined threshold are selected as split candidates. In the example of FIG. 7, split candidates 732 and 734 are identified.

At step 550, for each split candidate identified at step 540, a split ratio $r_s=N_{s1}/N_{s2}$ is determined, where $N_{s1}$ is the number of traced paths that follow a first branch after the split candidate and $N_{s2}$ is the number of traced paths that follow a second branch after the split candidate.

At step 560, for each landmark candidate $a_i$ in $C_A$, a set of split candidates $\{S_i\}$ that are traversed by a path passing through the respective landmark candidate $a_i$ is identified.

At step 570, for each landmark candidate $a_i$ in $C_A$, a best split candidate $S_i^*$ within $\{S_i\}$ is identified. It has been observed that split candidates having a large $N_s$ and a split ratio $r_s$ close to one are most likely to be the true bifurcation. Accordingly, in the exemplary embodiment, bifurcation analysis module 290 uses a linear Support Vector Machine function R, which is trained to produce a probability value based on $N_s$ and $r_s$, to identify within a set of split candidates $\{S_i\}$ the split having the largest R as the best split candidate $S_i^*$.

At step 580, an edge potential value for every possible pair of landmark candidates $(a_i, b_j)$ is determined based on the distance from the landmark candidate $b_j$ to the best split candidate $s_i^*$ associated with $a_i$. It has been observed that the smaller the distance $D(b_j, s_i^*)$ from a landmark candidate $b_j$ to a best split candidate $s_i^*$, the more likely it will be that the landmark candidate $b_j$ is the target landmark B. In the exemplary embodiment, bifurcation analysis module 290 calculates the edge potential value for a pair of candidate landmarks $(a_j, b_j)$ based on the following formula:

$$\text{Edge Potential Value}(a_i, b_j) = R(s_i^*)/D(b_j, s_i^*)$$

In some embodiments, the method steps described in FIG. 5 are defined by computer program instructions that are stored in memory 230 of landmark detection unit 120 and executed by processor 210. In one example, landmark detection unit 120 comprises various computer program instructions implemented as computer executable code appropriately programmed by one skilled in the art to perform the algorithm defined by the method steps described in FIG. 5. By executing the computer program instructions, processor 210 executes the algorithm defined by the method steps of FIG. 5.

As discussed above with reference to FIG. 3, after node potential values and edge potential values are obtained, landmark candidates are analyzed using a Markov random field model analysis, based on the node values and associated edge potential values. The result of the Markov random field model analysis (performed at step 340 of FIG. 3) is an optimal landmark candidate for each target landmark.

Figure 10:
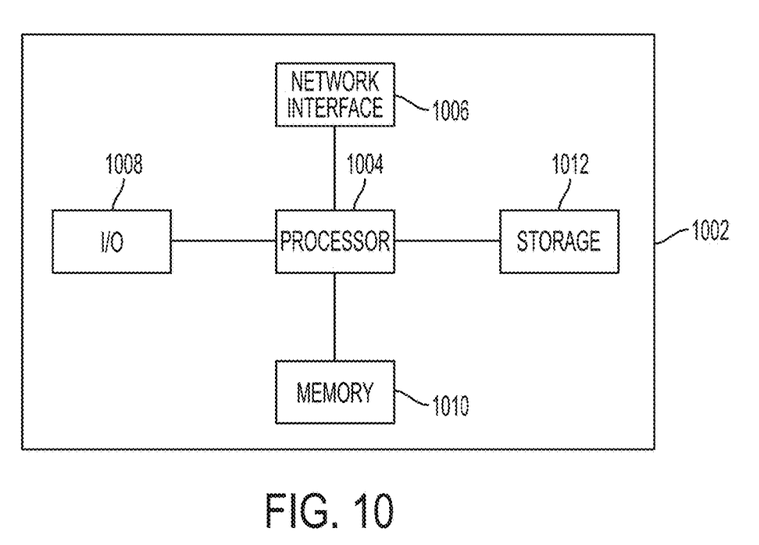
FIG. 10 is a high level block diagram of a computer capable of implementing the present invention.

The above-described methods for vascular landmark detection in a 3D volume may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.) and loaded into memory 1010 when execution of the computer program instructions is desired. Thus, the steps of the methods of FIGS. 3, 4, and 5 may be defined by the computer program instructions stored in the memory 1010 and/or storage 1012 and controlled by the processor 1004 executing the computer program instructions. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting target landmarks in an image volume, the method comprising:
    detecting a set of landmark candidates for each of a plurality of target landmarks in an image volume;
    generating a node potential value for each landmark candidate based at least in part on an error value determined using spatial histogram-based error regression;
    generating edge potential values for pairs of landmark candidates based on a bifurcation analysis of the image volume using vessel tracing; and
    determining an optimal landmark candidate for each target landmark, using a Markov random field model based on the node potential values and the edge potential values.

2. The method of claim 1, further comprising detecting one or more guide slices in the image volume, wherein said step of detecting a set of landmark candidates for each of a plurality of target landmarks in an image volume comprises:
    detecting the set of landmark candidates for each of a plurality of target landmarks in an image volume based on the detected one or more guide slices in the image volume.

3. The method of claim 2, wherein said step of detecting one or more guide slices in the image volume comprises:
    detecting one or more slice candidates for each of a plurality of guide slices using a plurality of trained slice detectors, wherein each of the plurality of trained slice detectors detects the one or more slice candidates for a corresponding one of the plurality of guide slices; and
    determining an optimal slice candidate for each of the plurality of guide slices using a Markov random field model.

4. The method of claim 2, wherein said step of detecting one or more guide slices in the image volume comprises:
    detecting a guide slice associated with each of: a skull base, a jaw, an upper lung, an upper liver, and a hip bone.

5. The method of claim 2, wherein said step of detecting the set of landmark candidates for each of a plurality of target landmarks in an image volume based on the detected one or more guide slices in the image volume comprises:
    detecting the set of landmark candidates for each of a plurality of target landmarks using a plurality of trained landmark detectors, wherein each of the plurality of trained landmark detectors detects the landmark candidates for a corresponding one of the plurality of target landmarks and each of the plurality of trained landmark detectors is constrained to a corresponding search region determined based on the detected one or more guide slices.

6. The method of claim 1, further comprising:
receiving the image volume from one of: a computerized tomography (CT) scanner or a magnetic resonance imaging (MRI) device.

7. The method of claim 1, wherein the plurality of target landmarks comprises the following vascular landmarks: a left carotid (LC), a right carotid (RC), a left renal (LR), a right renal (RR), a left subclavian (LS), a left common carotid (LCC), a brachiocephalic (BC), and a common iliac (CI).

8. The method of claim 1, wherein said step of generating a node potential value for each landmark candidate based at least in part on an error value determined using spatial histogram-based error regression comprises:
generating a spatial histogram corresponding to each landmark candidate;
comparing the spatial histogram corresponding to each landmark candidate to a plurality of stored spatial histograms generated based on annotated training data;
assigning an estimated error value to each landmark candidate based on the comparison; and
determining a node potential value for each landmark candidate based on the estimated error value.

9. The method of claim 8, wherein said step of determining a node potential value for each landmark candidate based on the estimated error value comprises:
assigning an inverse of the estimated error value as the node potential value for each landmark candidate.

10. The method of claim 8, wherein said step of determining a node potential value for each landmark candidate based on the estimated error value comprises:
combining the estimated error value for each landmark candidate with a probability value for each landmark candidate determined during detection of the landmark candidates.

11. The method of claim 1, wherein said step of generating edge potential values for pairs of landmark candidates based on a bifurcation analysis of the image volume using vessel tracing comprises:
defining a plane in the image volume;
creating a set of phantom points in the plane based on a selected set of landmark candidates for a first target landmark;
tracing paths between a plurality of pairs that include a phantom point and a landmark candidate from a selected set of landmark candidates for a second target landmark using a vessel tracing algorithm;
superimposing a plurality of paths selected from the traced paths to generate a path tree;
identifying in the path tree one or more split candidates representing a separation of two paths;
determining, for the one or more split candidates, a split ratio based on a number of traced paths that follow a first branch after the split candidate and a number of traced paths that follow a second branch after the split candidate;
for each of the selected set of landmark candidates for the second target landmark:
identifying a set of split candidates that are traversed by a path passing through the respective landmark candidate; and
identifying, from among the set of split candidates, a best split candidate based at least on the split ratios of the split candidates; and
determining edge potential values for pairs that include a landmark candidate from the selected set of landmark candidates for the first target landmark and a landmark candidate from the selected set of landmark candidates for the second target landmark, based on a distance from the landmark candidate from the selected set of landmark candidates for the first target landmark to the best split candidate associated with the landmark candidate from the selected set of landmark candidates for the second target landmark.

12. An apparatus for detecting target landmarks in an image volume, comprising:
a processor; and
a memory to store computer program instructions, the computer program instructions when executed on the processor cause the processor to perform operations comprising:
detecting a set of landmark candidates for each of a plurality of target landmarks in an image volume;
generating a node potential value for each landmark candidate based at least in part on an error value determined using spatial histogram-based error regression;
generating edge potential values for pairs of landmark candidates based on a bifurcation analysis of the image volume using vessel tracing; and
determining an optimal landmark candidate for each target landmark, using a Markov random field model based on the node potential values and the edge potential values.

13. The apparatus of claim 12, the operations further comprising detecting one or more guide slices in the image volume, wherein detecting a set of landmark candidates for each of a plurality of target landmarks in an image volume comprises:
detecting the set of landmark candidates for each of a plurality of target landmarks in an image volume based on the detected one or more guide slices in the image volume.

14. The apparatus of claim 13, wherein detecting one or more guide slices in the image volume comprises:
detecting a guide slice associated with each of: a skull base, a jaw, an upper lung, an upper liver, and a hip bone.

15. The apparatus of claim 12, wherein the plurality of target landmarks comprises the following vascular landmarks: a left carotid (LC), a right carotid (RC), a left renal (LR), a right renal (RR), a left subclavian (LS), a left common carotid (LCC), a brachiocephalic (BC), and a common iliac (CI).

16. The apparatus of claim 12, wherein generating a node potential value for each landmark candidate based at least in part on an error value determined using spatial histogram-based error regression comprises:
generating a spatial histogram corresponding to each landmark candidate;
comparing the spatial histogram corresponding to each landmark candidate to a plurality of stored spatial histograms generated based on annotated training data;
assigning an estimated error value to each landmark candidate based on the comparison; and
determining a node potential value for each landmark candidate based on the estimated error value.

17. The apparatus of claim 12, wherein generating edge potential values for pairs of landmark candidates based on a bifurcation analysis of the image volume using vessel tracing comprises:
defining a plane in the image volume;
creating a set of phantom points in the plane based on a selected set of landmark candidates for a first target landmark;
tracing paths between a plurality of pairs that include a phantom point and a landmark candidate from a selected set of landmark candidates for a second target landmark using a vessel tracing algorithm;
superimposing a plurality of paths selected from the traced paths to generate a path tree;
identifying in the path tree one or more split candidates representing a separation of two paths;
determining, for the one or more split candidates, a split ratio based on a number of traced paths that follow a first branch after the split candidate and a number of traced paths that follow a second branch after the split candidate;
identifying a set of split candidates that are traversed by a path passing through each respective landmark candidate;
identifying, from among the set of split candidates, a best split candidate based at least on the split ratios of the split candidates; and
determining edge potential values for pairs that include a landmark candidate from the selected set of landmark candidates for the first target landmark and a landmark candidate from the selected set of landmark candidates for the second target landmark, based on a distance from the landmark candidate from the selected set of landmark candidates for the first target landmark to the best split candidate associated with the landmark candidate from the selected set of landmark candidates for the second target landmark.

18. A non-transitory computer readable medium encoded with computer executable instructions for detecting target landmarks in an image volume, the computer executable instructions defining steps comprising:
detecting a set of landmark candidates for each of a plurality of target landmarks in an image volume;
generating a node potential value for each landmark candidate based at least in part on an error value determined using spatial histogram-based error regression;
generating edge potential values for pairs of landmark candidates based on a bifurcation analysis of the image volume using vessel tracing; and
determining an optimal landmark candidate for each target landmark, using a Markov random field model based on the node potential values and the edge potential values.

19. The computer readable medium of claim 18, further comprising computer executable instructions defining the step of detecting one or more guide slices in the image volume, wherein the compute executable instructions defining the step of detecting a set of landmark candidates for each of a plurality of target landmarks in an image volume comprise computer executable instructions defining the step of:
detecting the set of landmark candidates for each of a plurality of target landmarks in an image volume based on the detected one or more guide slices in the image volume.

20. The computer readable medium of claim 19, wherein the computer executable instructions defining the step of detecting one or more guide slices in the image volume comprise computer executable instructions defining the step of:
detecting a guide slice associated with each of: a skull base, a jaw, an upper lung, an upper liver, and a hip bone.

21. The computer readable medium of claim 18, wherein the plurality of target landmarks comprises the following vascular landmarks: a left carotid (LC), a right carotid (RC), a left renal (LR), a right renal (RR), a left subclavian (LS), a left common carotid (LCC), a brachiocephalic (BC), and a common iliac (CI).

22. The computer readable medium of claim 18, wherein the computer executable instructions defining the step of generating a node potential value for each landmark candidate based at least in part on an error value determined using spatial histogram-based error regression comprise computer executable instructions defining the steps of:
generating a spatial histogram corresponding to each landmark candidate;
comparing the spatial histogram corresponding to each landmark candidate to a plurality of stored spatial histograms generated based on annotated training data;
assigning an estimated error value to each landmark candidate based on the comparison; and
determining a node potential value for each landmark candidate based on the estimated error value.

23. The computer readable medium of claim 18, wherein the computer executable instructions defining the step of generating edge potential values for pairs of landmark candidates based on a bifurcation analysis of the image volume using vessel tracing comprise computer executable instructions defining the steps of:
defining a plane in the image volume;
creating a set of phantom points in the plane based on a selected set of landmark candidates for a first target landmark;
tracing paths between a plurality of pairs that include a phantom point and a landmark candidate from a selected set of landmark candidates for a second target landmark using a vessel tracing algorithm;
superimposing a plurality of paths selected from the traced paths to generate a path tree;
identifying in the path tree one or more split candidates representing a separation of two paths;
determining, for the one or more split candidates, a split ratio based on a number of traced paths that follow a first branch after the split candidate and a number of traced paths that follow a second branch after the split candidate;
for each of the selected set of landmark candidates for the second target landmark:
identifying a set of split candidates that are traversed by a path passing through the respective landmark candidate; and
identifying, from among the set of split candidates, a best split candidate based at least on the split ratios of the split candidates; and
determining edge potential values for pairs that include a landmark candidate from the selected set of landmark candidates for the first target landmark and a landmark candidate from the selected set of landmark candidates for the second target landmark, based on a distance from the landmark candidate from the selected set of landmark candidates for the first target landmark to the best split candidate associated with the landmark candidate from the selected set of landmark candidates for the second target landmark.

* * * * *